United States Patent [19]

Giordani

[11] 4,353,577
[45] Oct. 12, 1982

[54] ADJUSTABLE-BACKREST COLLAPSIBLE STROLLER

[76] Inventor: Pietro Giordani, Via Rupe, 19 - Sasso Marconi (Province of Bologna), Italy

[21] Appl. No.: 97,583

[22] Filed: Nov. 26, 1979

[30] Foreign Application Priority Data

May 8, 1979 [ES] Spain ..................................... 480.368

[51] Int. Cl.³ ............................................... B62B 7/02
[52] U.S. Cl. .................................... 280/642; 280/644; 280/42; 280/647; 280/650
[58] Field of Search ................ 280/42, 647, 650, 658, 280/644, 642; 297/68

[56] References Cited

U.S. PATENT DOCUMENTS

| 3,666,292 | 5/1972 | Bartos | 280/42 |
| 4,007,947 | 2/1977 | Perego | 280/42 |
| 4,077,641 | 3/1978 | Perego | 280/42 |
| 4,094,531 | 6/1978 | Cabagnero | 280/650 |
| 4,173,355 | 11/1979 | Perego | 280/650 |
| 4,181,317 | 1/1980 | Toda | 280/42 |

Primary Examiner—Robert R. Song
Attorney, Agent, or Firm—Guido Modiano; Albert Josif

[57] ABSTRACT

An adjustable backrest collapsible stroller has a stroller frame formed in two matched side half-frames each whereof comprises three tubular elements, constituting respectively a rear leg, a front leg and a stroller pushing arm.

3 Claims, 3 Drawing Figures

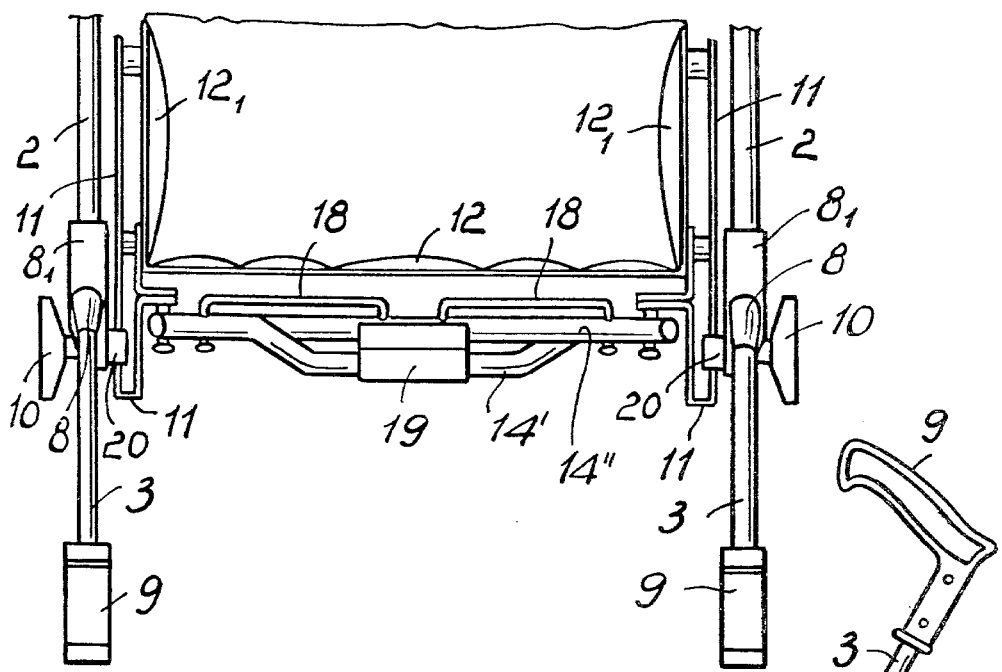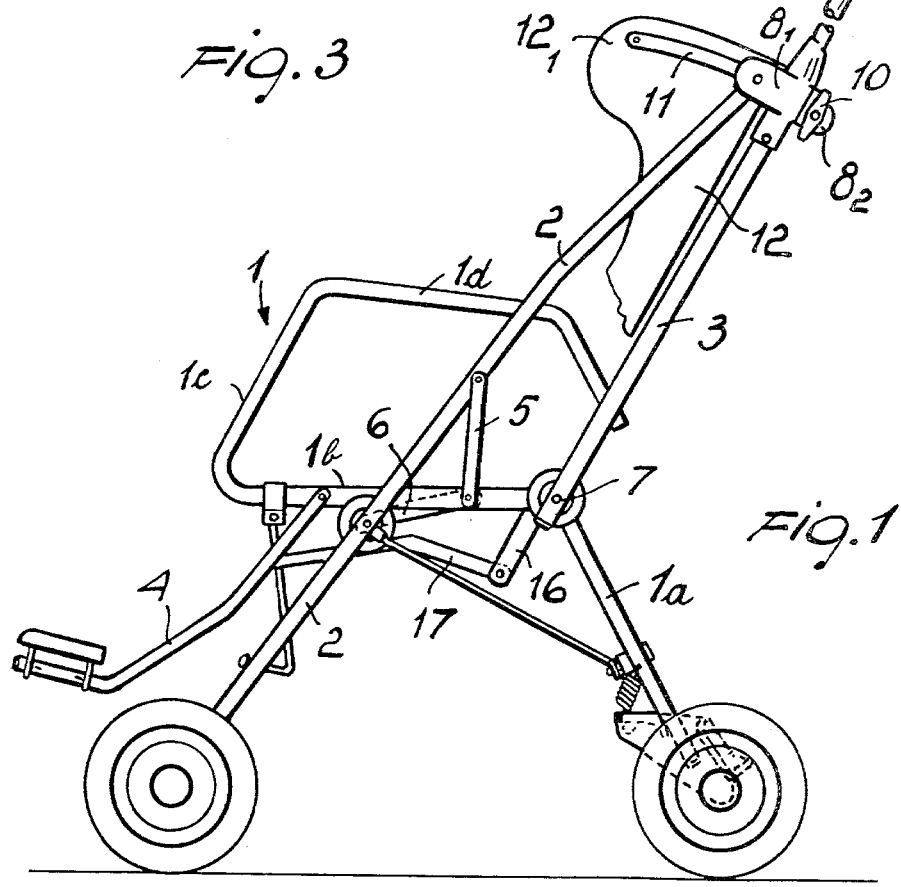

ADJUSTABLE-BACKREST COLLAPSIBLE STROLLER

BACKGROUND OF THE INVENTION

This invention relates to improvements in the construction of baby strollers of the collapsible or fold-down type having an adjustable backrest, and more specifically, a stroller of a type wherein the four legs of the stroller bear a mutual relationship—in a known manner not claimed herein—according to which as the legs of one side are brought close to the legs of the other side to reduce the stroller width, the two front legs and rear legs are simultaneously caused to move towards one another, thus reducing the stroller length as well.

The instant improvements relate to some particular aspects of the stroller assembly, such as the arrangement and strength of the basic frame, the actuating device for the fold-down and narrowing action, and the device for adjusting the backrest angle; all such improvements affording important advantages of construction simplification, effective operation, and handling convenience.

SUMMARY OF THE INVENTION

According to the invention there is provided in a widthwise and lengthwise collapsible baby stroller having a longitudinal plane of symmetry, an adjustable backrest structure, a seat structure defining a seating plane and four legs supporting the backrest and seat structure, and including a pair of approachable wheeled front legs and a pair of approachable wheeled rear legs, the improvement comprising said seat structure including a left side portion and a right side portion in symmetrical relationship to each other with respect to said longitudinal plane of symmetry, each of said side portions comprising a multiply bent rod member having a first extension forming integral therewith one of said rear legs, a second extension integral therewith beginning at a first bent of said rod member and directed transverse to said first extension and parallel to said seating plane, a third extension extending transverse to said second extension in a direction opposite to said rear leg forming first extension and departing from a second bent of said rod member at the front side of said second extension remote from said first bent and a fourth extension extending from a third bent of said rod member remote from said second bent and extending above and in the direction of said seat forming second extension from the front towards the rear of the stroller, said third and fourth extension forming one of symmetrically arranged armrests of the stroller, said backrest structure including symmetrically arranged on each lateral sides thereof an upright rod member articulated at a lower end thereof with said multiply bent rod member at said first bent thereof and having at the opposite end thereof a handle member for the stroller, a first articulation point supported by said upright rod member and located below and adjacent said handle member, said pair of approachable wheeled front legs including for each front leg a connecting rod member extending from the respective front wheel up to said first articulation point defining a first articulation relationship between said connecting rod member and said upright rod member, lever means connected with said second extension of said multiply bent rod member and providing a second articulation point defining a second articulation relationship between said connecting rod member and said multiply bent rod member, said backrest structure including further a central structure portion angularly adjustable with respect to said upright rod members, said central structure portion having a lower end thereof connected in articulation relationship with said multiply bent rod member at said first bent thereof, said central structure portion having an upper end thereof including guide means extending in the longitudinal direction of the stroller, said upright rod members having slider means rigid therewith and in slidable engagement with said guide means to allow adjustable displacement of said upper end of said central structure portion along said guide means thereby to cause angular displacement of said central structure portion about said articulation relationship thereof.

BRIEF DESCRIPTION OF THE DRAWING

For a clearer appreciation of the above, the improvements according to this invention will be described hereinafter with reference to the accompanying drawings which illustrate in part elements of the stroller which are known already, and in part the stroller elements which incorporate the instant improvements, by way of example and not of limitation, thereby any modifications of details, shapes, dimensions and materials, if merely incidental and not affecting the achievement of novel and distinctive results, should be considered as included in this invention scope.

In the drawings:

FIG. 1 is a side elevation view of the stroller frame, as incorporating the improvements according to this invention;

FIG. 3 is a view of the top portion of the stroller, showing the backrest folding and angle adjusting mechanisms.

DESCRIPTION OF PREFERRED EMBODIMENTS

Figure 2:
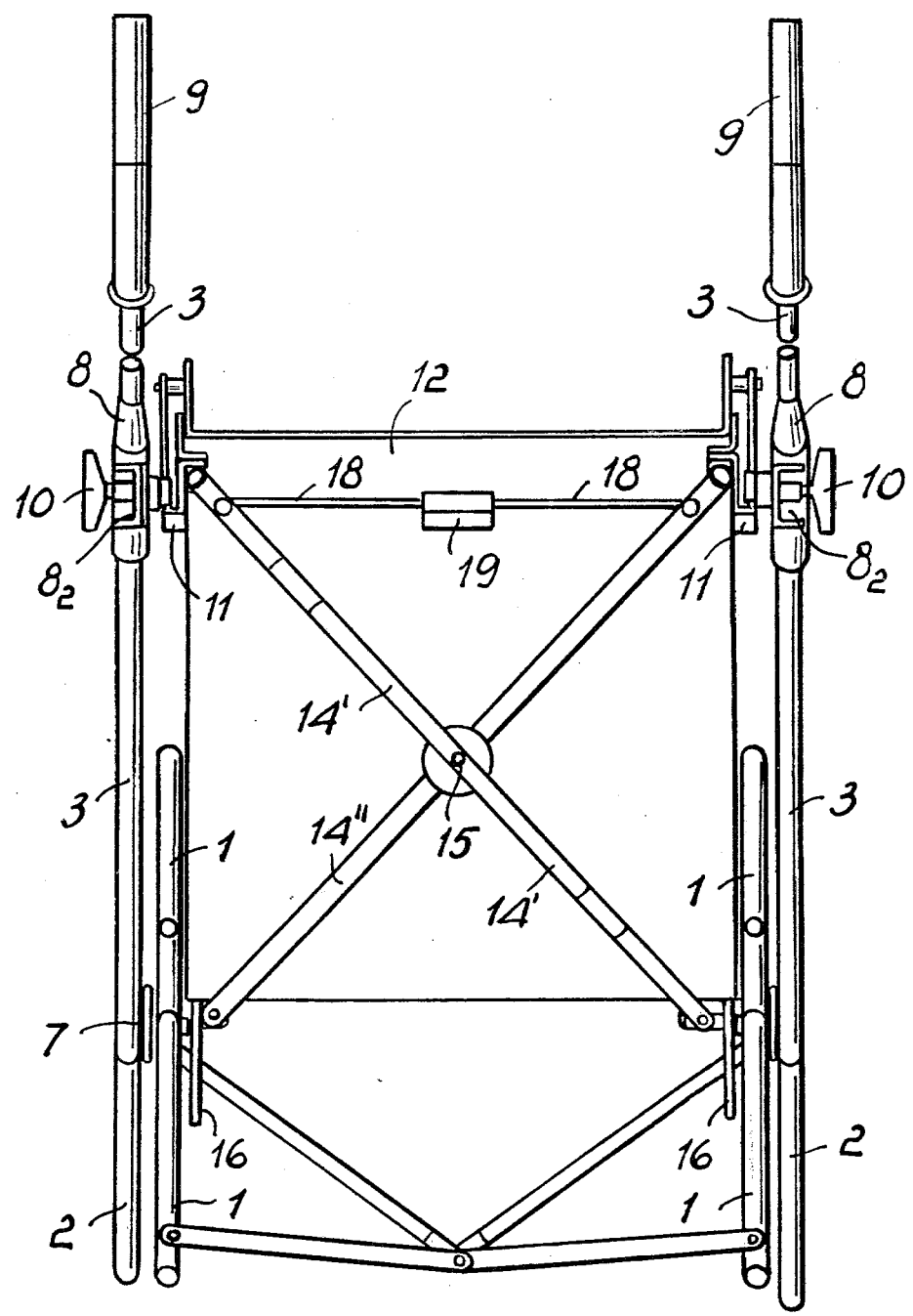
FIG. 2 is a rear elevational view of the stroller backrest, as provided with means which, in accordance with the invention, allow the backrest to be folded down as the stroller assembly is being reduced to its collapsed or narrow condition.

In the drawing figures, the numeral 1 denotes two equal multiply bent tubular rod elements arranged at opposite sides of the stroller. Each tubular element 1 is formed of four extensions integral therewith: a first extension 1a defining the rear legs thereof, a second extension 1b defining part of the seat frame, and a third and fourth extensions 1c and 1d defining the armrest of said seat; the numeral 2 denotes two tubular elements constituting the front legs of the stroller, symmetrically arranged on either side thereof; the numeral 3 denotes one of two symmetrical tubular elements which, on either side of the stroller, which are part of the backrest structure and constitute the arms for the stroller pushing handles; and the numeral 4 denotes two symmetrical tubular elements which constitute, on either side of the stroller, part of the frame for the footrest.

In addition to some links (not shown) whereby the four legs of the stroller are interconnected for their movements to and from one another, such as to reduce the stroller width and length whenever desired, the elements 1 and 2 are articulated to each other through levers 5 and 6.

The element 3 is connected with its bottom portion to the element 1 at engagement point 7, its top portion extends through a sleeve 8 and is associated with a transversely extending handle 9.

Said sleeve 8 is provided, at its front and rear portions, with lugs $8_1$ and $8_2$. Articulated to lug 81, with provision for rotation, is the top end of the element 2. Mounted to lug 81 is slider element 20 which can be locked through a control element 10. Slidable with respect to slider element 20 with provision for locking, by means of said control element 10, to any point in its stroke, is elongated an U-like element 11 with dissimilar legs which is connected to the top portion of the headrest side extension $12_1$ of the backrest 12.

Connected to the short leg of each of the symmetrical elements 11 are the respective top ends of the two arms 14', 14", articulated to each other, and crossing each other at the intersection 15. The central portion of arm 14' is slightly offset to allow crossing with arm 14" without interference, and the bottom ends of arms 14', 14" are articulated to flanges 16 which, at another portion thereof, are connected to the elements 1 at the point 7 of junction of the elements 1 and 3. Arms 14' and 14" define a central angularly adjustable structure portion of the backrest structure.

Said flanges 16 are in turn articulated to one end of links 17, the other end whereof is articulated to the frame 4 of the footrest.

Articulated proximate to the top ends of the arms 14', 14", are the ends of two rods 18, the other ends thereof being received, with provision for rotation, in a control element 19.

The articulation of the ends of the rods 18 to the element 19 is arranged such that said element 19 is prevented from lowering beyond the position whereat the rods 18 are aligned to each other, as shown in FIG. 3; that is to say, the position which corresponds to the maximum full widthwise extension of the backrest, which is held in that position by the tension on the two facing or aligned rods 18. However, said control element 19 can be manually moved upwards, thereby the rods 18 are rotated into an inverted "V" configuration the vertex whereof coincides with said element 19. The resulting reduction of the distance between the two remote ends of said rods 18 produces an approaching movement of the respective ends of the two crossing arms 14', 14", and accordingly, the folding of the backrest and narrowing of the stroller, which narrowing movement will cause, in turn, the front and rear lgs to move towards one another through the cited conventional device. It will be apparent that the manual downward operation of the element 19, to reach the position shown in FIG. 3, will extend the stroller back into its normal operating size.

By loosening the threaded control elements 10, the elements 11 are enabled to move freely back and forth within the element 20, thus imparting to the backrest, within the limits of length of the elements 11, the angle selected, in which position it can be locked by tightening the control elements 10.

The backrest angle will determine, through the intermediary of the flange 16 and link 17, a corresponding angle adjustment of the footrest.

After describing the gist of this invention and parts thereof in a sufficient measure, it is intended that what constitutes its essence and defines its scope is indicated in the appended claims.

We claim:

1. In a widthwise and lengthwise collapsible baby stroller having a longitudinal plane of symmetry, an adjustable backrest structure, a seat structure defining a seating plane and four legs supporting the backrest and seat structure, and including a pair of approachable wheeled front legs and a pair of approachable wheeled rear legs, the improvement comprising said seat structure including a left side portion and a right side portion in symmetrical relationship to each other with respect to said longitudinal plane of symmetry, each of said side portions comprising a multiply bent rod member having a first extension forming integral therewith one of said rear legs, a second extension integral therewith beginning at a first bent of said rod member and directed transverse to said first extension and parallel to said seating plane, a third extension extending transverse to said second extension in a direction opposite to said rear leg forming first extension and departing from a second bent of said rod member at the front side of said second extension remote from said first bent and a fourth extension extending from a third bent of said rod member remote from said second bent and extending above and in the direction of said seat forming second extension from the front towards the rear of the stroller, said third and fourth extension forming one of symmetrically arranged armrests of the stroller, said backrest structure including symmetrically arranged, on each lateral sides thereof an upright rod member articulated at a lower end thereof with said multiply bent rod member at said first bent thereof and having at the opposite end thereof a handle member for the stroller, a first articulation point supported by said upright rod member and located below and adjacent said handle member, said pair of approachable wheeled front legs including for each front leg a connecting rod member extending from the respective front wheel up to said first articulation point defining a first articulation relationship between said connecting rod member and said upright rod member, lever means connected with said second extension of said multiply bent rod member and providing a second articulation point defining a second articulation relationship between said connecting rod member and said multiply bent rod member, said backrest structure including further a central structure portion angularly adjustable with respect to said upright rod members, said central structure portion having a lower end thereof connected in articulation relationship with said multiply bent rod member at said first bent thereof, said central structure portion having an upper end thereof including guide means extending in the longitudinal direction of the stroller, said upright rod members having slider means rigid therewith and in slidable engagement with said guide means to allow adjustable displacement of said upper end of said central structure portion along said guide means thereby to cause angular displacement of said central structure portion about said articulation relationship thereof.

2. A stroller according to claim 1, wherein said guide means are in the form of an U-bent elongated member.

3. A stroller according to claim 1, wherein said central structure portion includes two crossing rods supporting at the upper ends thereof said guide means and having articulation means at the lower end thereof for said second articulation relationship, said central structure portion further includes a foldable controlling lever system at one end thereof, for controlling the widthwise collapsibility of the stroller.

* * * * *